(12) United States Patent
Hu et al.

(10) Patent No.: US 8,365,989 B2
(45) Date of Patent: Feb. 5, 2013

(54) IC CARD

(76) Inventors: Chih-Kuei Hu, Jubei (TW); Wei-Ting Liu, Haclenda Heights, CA (US); Wei-Hua Lu, Taipei (TW)

(*) Notice: Subject to any disclaimer, the term of this patent is extended or adjusted under 35 U.S.C. 154(b) by 347 days.

(21) Appl. No.: 12/693,458

(22) Filed: Jan. 26, 2010

(65) Prior Publication Data

US 2011/0180599 A1 Jul. 28, 2011

(51) Int. Cl.
*G06K 5/00* (2006.01)
(52) U.S. Cl. .......................... 235/380; 235/382
(58) Field of Classification Search .............. 235/380, 235/382, 382.5, 375
See application file for complete search history.

(56) References Cited

U.S. PATENT DOCUMENTS

| | | | |
|---|---|---|---|
| 2006/0049263 A1* | 3/2006 | Ou et al. | 235/492 |
| 2008/0278469 A1* | 11/2008 | Terliuc et al. | 345/209 |

* cited by examiner

*Primary Examiner* — Karl D Frech

(57) ABSTRACT

An IC card includes: a card body; a conductive pad for receiving a power and an updating information; an electro-phoretic display located on the card body for displaying an information; and a driving circuit, coupled to the conductive pad and the electro-phoretic display, for receiving the power and the updating information from the conductive pad and driving the electro-phoretic display according to the updating information.

30 Claims, 4 Drawing Sheets

Providing a card reader for updating an IC card.

↓

Electrically connecting the card reader and the IC card.

↓

Providing the power and the updating information from the pins of the card reader to a conductive pad of the IC card.

↓

Driving the electro-phoretic display to display an information according to the updating information.

Fig. 4

IC CARD

BACKGROUND OF THE INVENTION

1. Field of the Invention

The present invention relates to an IC card, and more particularly, to an IC card having an electro-phoretic display for displaying information.

2. Description of the Prior Art

The IC card is popularly used in many purposes, such as credit card, computer security, financial, health care and personal identify. The characteristic of the IC card is that the card has a memory for storing personal information or security code. When the IC card is utilized in security purpose, the security machine will read the security code stored in the IC card to identify the user. When the IC card is utilized in banking purpose, the ATM machine will read the banking account information stored in the IC card.

The information stored in the conventional IC card can be only read by machine via the card reader, and users cannot recognize the information stored or updated in the IC card. It causes some inconvenience to the card holders.

SUMMARY OF THE INVENTION

It is therefore an objective of the present invention to provide an IC card having an electro-phoretic display for displaying information.

According to an objective of the present invention, an IC card is provided. The IC card comprises: a card body; a conductive pad for receiving a power and an updating information; an electro-phoretic display located on the card body for displaying an information; and a driving circuit, coupled to the conductive pad and the electro-phoretic display, for receiving the power and the updating information from the conductive pad and driving the electro-phoretic display according to the updating information.

According to another objective of the present invention, an IC card system is provided. The IC card system comprises: an IC card and a card reader. The IC card comprises: a card body; a conductive pad for receiving a power and an updating information; an electro-phoretic display located on the card body for displaying an information; and a driving circuit, electrically connected to the conductive pad and the electro-phoretic display, for receiving the power and the updating information from the conductive pad and driving the electro-phoretic display according to the updating information. The card reader comprises: a socket for allowing the IC card to plug in; a plurality of pins, for electrically connecting to the conductive pad when the IC card is being plugged in the socket; a power source, electrically connected to the pins, for providing the power to the IC card; and a controller, electrically connected to the pins, for providing the updating information to the IC card.

According to another objective of the present invention, a method for displaying an information on an IC card is provided. The IC card comprising a card body, a conductive pad, an electro-phoretic display located on the card body. The method comprises: providing a power to the IC card via the conductive pad; providing an updating information corresponding to the information to the IC card via the conductive pad; and driving the electro-phoretic display to display the information according to the updating information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flow chart of a method for displaying an information on an IC card according to the present invention.

DETAILED DESCRIPTION

Figure 1:
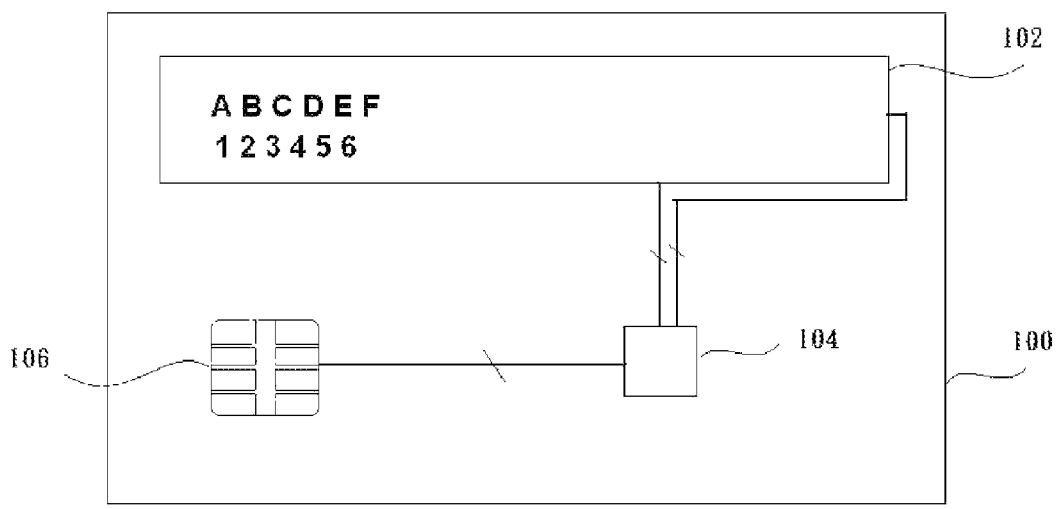
FIG. 1 is a diagram of an IC card according to the present invention.

Please refer to FIG. 1, which shows an IC card according to the present invention. The IC card comprises a card body 100, an electro-phoretic display 102, a driving circuit 104 and a conductive pad 106. The electro-phoretic display 102 is located on the card body 100 for displaying card information. The electro-phoretic display 102, or called electronic paper, is used for converting an electrical action into an optical action. The electro-phoretic display 102 comprises a layer of electro-phoretic material, a term which is used herein in its conventional meaning in the imaging art to refer to a material having first and second display states differing in at least one optical property, the material being changed from its first to its second display state by application of an electric field to the material.

The conductive pad 106 is used for receiving a power and an updating information. The driving circuit 104 is coupled to the conductive pad 106 and the electro-phoretic display 102, and the driving circuit 104 receives the power and the updating information from the conductive pad 106 and drives the electro-phoretic display 102 according to the updating information. The driving circuit 104 comprises a select driver and a data driver for driving the electro-phoretic display 102, and the select driver and the data driver can drive the electro-phoretic display 102 via a plurality of data lines and a plurality of select lines to define the pixels of the electro-phoretic display 102. The driving circuit 104 can further comprise a memory for storing the card information. Certainly, the memory can be also separated from the driving circuit 104 according to the chip design.

Figure 2:
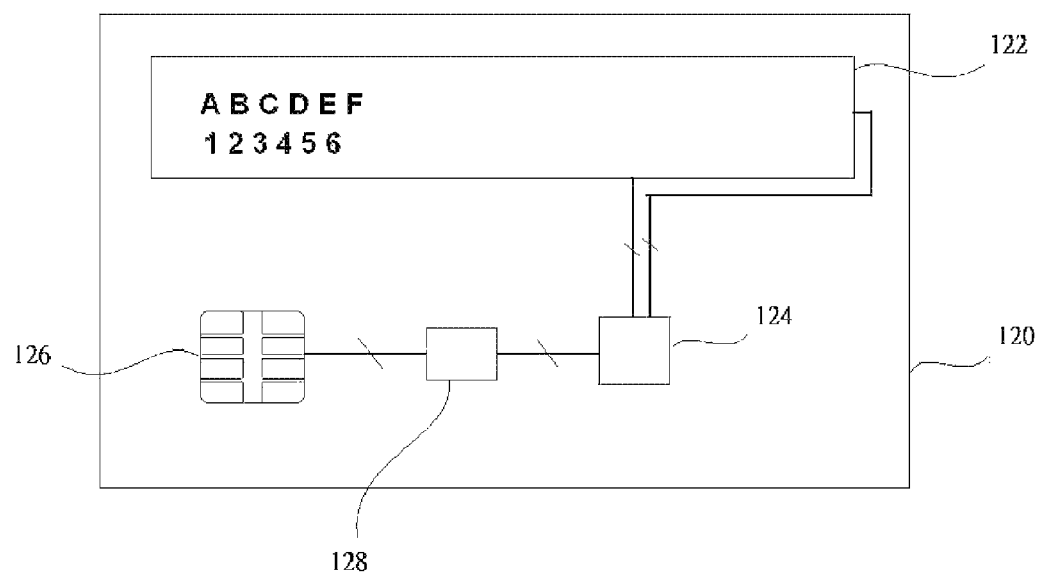
FIG. 2 is a diagram of another IC card according to the present invention.

Please refer to FIG. 2, which shows another IC card according to the present invention. The IC card comprises a card body 120, an electro-phoretic display 122, a driving circuit 124, a conductive pad 126 and a memory 128. The electro-phoretic display 122 is located on the card body 120 for displaying card information. The electro-phoretic display 122, or called electronic paper, is used for converting an electrical action into an optical action. The conductive pad 126 is used for receiving a power and an updating information. The memory 128 is electrically coupled to the conductive pad 126 and the driving circuit 124 for storing the card information or the updating information. As shown in FIG. 2, the memory 128 receives the power and the updating information from the conductive pad 126, and then stores the updating information. The driving circuit 124 is coupled to the memory 128 and the electro-phoretic display 122, and the driving circuit 124 receives the power and the updating information from the memory 128 and drives the electro-phoretic display 122 according to the updating information. Please note, in this embodiment, the power is transmitted from the conductive pad 126 through the memory 128 to the driving circuit 124, however, the power can be also transmitted from the conductive pad 126 to the memory 128 and the driving circuit 124 separately. Whenever the driving circuit 124 receives the power, the driving circuit 124 can also receive the updating information from the memory 128. The updating information could be previously stored in the memory 128, or instantaneously received from the conductive pad 126. Furthermore, the driving circuit 124 can read both the information previously stored in the memory 128 and the information instantaneously received from the conductive pad 126, and then determine which information will be shown on the electro-phoretic display 122 according to the information content, information time, or some pre-defined criteria.

The conductive pad of the IC card comprises several contacts. When inserted the IC card into a card reader, the pins of the card reader can electrically connect the contacts of the IC card to read information from the memory and write information back. In the general condition, the conductive pad should meet the ISO/IEC 7810 and ISO/IEC 7816 standards. The standards define the pad shape, position and functionality of the contacts. According to the standards, the conductive pad comprises eight contacts, and in which, two contacts are reserved with no function. In the present invention, the conductive pad comprises a power contact for receiving the power, and a signal contact for receiving the updating information. The power contact defined in the ISO/IEC standards can be utilized as the power contact of the present invention, and the reserved contacts defined in the ISO/IEC standards can be utilized as the signal contact of the present invention. Therefore, the present invention can meet the ISO/IEC definition, and can be popularly used. Certainly, the contact definition according to the ISO/IEC standards is one embodiment of the present invention, and the amount, position and functionality of the contacts can be also arranged as user defined. For example, the signal contact can be utilized to transfer the personal information or the security code as convention, and the reserved contact can be utilized to transfer the updating information. In another design, the signal contact can be utilized to transfer both the personal information or the security code and the updating information with serial transmission or time division method. For example, the personal information or the security code stored in the memory can be read out via the signal contact, and then the updating information can be written to the memory or the driving circuit via the same signal contact.

Figure 3:
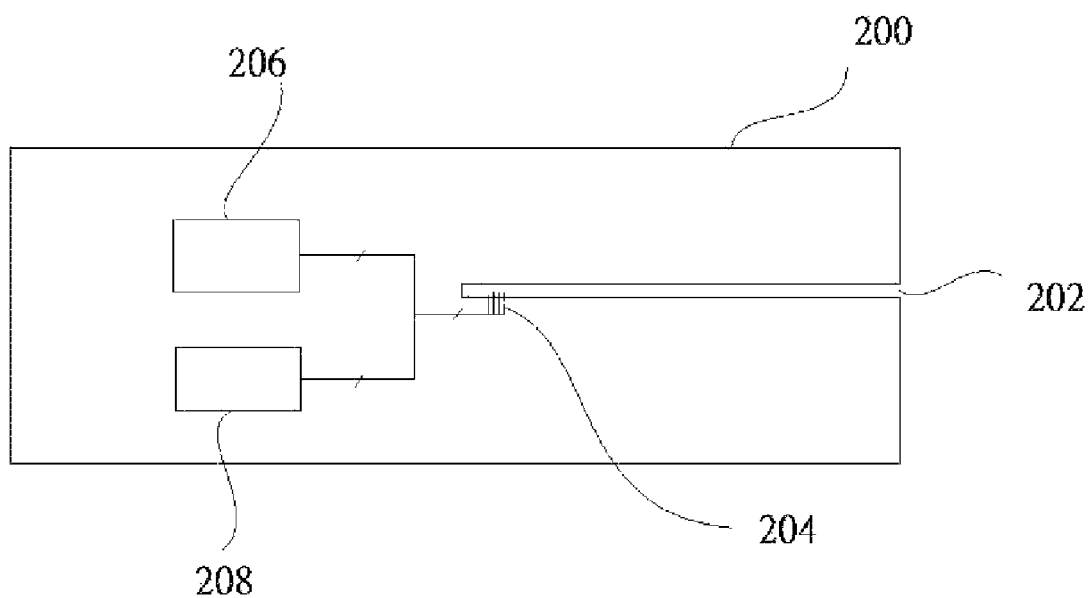
FIG. 3 is a diagram of a card reader according to the present invention.

Please refer to FIG. 3, which shows a card reader according to the present invention. The card reader 200 comprises a socket 202, a plurality of pins 204, a power source 206 and a controller 208. The socket 202 is used for inserting the IC card, and the pins 204 are used for electrically connecting to the contacts of the conductive pad 106 when the IC card is plugged in the socket 202. The power source 206 is electrically connected to the pins 204, for providing the power to the IC card. The controller 208 is electrically connected to the pins 204, for reading the information in the IC card and providing the updating information to the IC card.

The card reader 200 can be connected to a host, such as a computer or a server, and the host provides the updating information to the card reader and then the card reader provides the updating information to the IC card according to the updating information. The updating information can be commercial information, such as sales promotion. The updating information can be also a personalized information, such as membership status or health care information. The updating information is provided to the controller 208 from the host, and then written into the IC card via the pins 204. The driving circuit 104 receives the updating information from the pins 204 and the conductive pad 106, and then updates the electro-phoretic display 102 according to the updating information.

Please refer to FIG. 4, which shows a flow chart of the method for displaying an information on an IC card. The IC card comprises a card body, a conductive pad and an electro-phoretic display located on the card body. The method comprises: providing a power to the IC card via the conductive pad; electrically connecting the card reader and the IC card; providing a power and an updating information corresponding to the information to the IC card via the conductive pad; and driving the electro-phoretic display to display the information according to the updating information. The driving circuit comprises a select driver and a data driver for driving the electro-phoretic display via the select driver and the data driver. The driving circuit can further comprise a memory for storing the information. Certainly, the memory can be also separated from the driving circuit according to the chip design. The conductive pad comprises at least one power contact and at least one signal contact. Therefore, the step of providing the power to the IC card comprises: providing the power to the IC card via the power contact; and the step of providing the updating information corresponding to the information to the IC card comprises: providing the updating information to the IC card via the signal contact. The method further provides a card reader, which comprises a socket for placing the IC card, a plurality of pins, a power source and a controller. Hence, the method further comprises: electrically connecting the power source to the pins and providing the power to the IC card via the pins; and electrically connecting the controller to the pins and providing the updating information to the IC card via the pins. In the present invention, a host, such as a computer or a server, can be electrically connected to the card reader for providing the information to the card reader, and the card reader provides the updating information to the IC card according to the information.

Those skilled in the art will readily observe that numerous modifications and alterations of the device and method may be made while retaining the teachings of the invention.

What is claimed is:

1. An IC card comprising:
   a card body;
   a conductive pad for receiving a power and an updating information;
   an electro-optic display located on the card body for displaying an information; and
   a driving circuit, comprising a select driver and a data driver, electrically coupled to the conductive pad and the electro-optic display, for receiving the power from the conductive pad and driving the electro-optic display via a plurality of data lines and a plurality of select lines according to the updating information.

2. The IC card of claim 1, wherein the driving circuit comprises a memory, for receiving the updating information from the conductive pad.

3. The IC card of claim 1 further comprising:
   a memory, electrically coupled to the conductive pad and the driving circuit, for receiving the updating information from the conductive pad, and providing the updating information to the driving circuit.

4. The IC card of claim 1, wherein the conductive pad comprises:
   a power contact for receiving the power; and
   a signal contact for receiving the updating information.

5. The IC card of claim 4, wherein the IC card provides a data stored in a memory via the signal contact and receives the updating information via the signal contact with a time-division transmission.

6. An IC card system comprising:
an IC card, comprising:
a card body;
a conductive pad for receiving a power and an updating information;
an electro-optic display located on the card body for displaying an information; and
a driving circuit, comprising a select driver and a data driver, electrically coupled to the conductive pad and the electro-optic display, for receiving the power from the conductive pad and driving the electro-optic display via a plurality of data lines and a plurality of select lines according to the updating information; and
a card reader, comprising:
a socket for allowing the IC card to plug in;
a plurality of pins, for electrically connecting to the conductive pad when the IC card is plugged in the socket;
a power source, electrically connected to the pins, for providing the power to the IC card; and
a controller, electrically connected to the pins, for providing the updating information to the IC card.

7. The IC card system of claim 6, wherein the driving circuit comprises a memory, for receiving the updating information from the conductive pad.

8. The IC card system of claim 6 further comprising:
a memory, electrically coupled to the conductive pad and the driving circuit, for receiving the updating information from the conductive pad, and providing the updating information to the driving circuit.

9. The IC card system of claim 6, wherein the conductive pad comprises:
a power contact for receiving the power; and
a signal contact for receiving the updating information.

10. The IC card system of claim 9, wherein the IC card provides a data stored in a memory to the card reader via the signal contact and receives the updating information from the card reader via the signal contact with a time-division transmission.

11. The IC card system of claim 6 further comprising a host electrically connecting to the card reader, wherein the host provides a commercial information or a personalized information to the card reader, and the card reader provides the updating information to the IC card according to the commercial information or the personalized information.

12. A method for displaying an information on an IC card, the IC card comprising a card body, a conductive pad, and an electro-optic display located on the card body, and the method comprising:
providing a power to the IC card via the conductive pad;
providing a commercial information or a personalized information to the IC card via the conductive pad; and
utilizing the electro-optic display to display the information according to the commercial information or the personalized information.

13. The method of claim 12, wherein the IC card further comprises a memory, and the step of providing the commercial information or the personalized information to the IC card via the conductive pad comprising:
storing the commercial information or the personalized information in the memory; and
providing the commercial information or the personalized information to the electro-optic display.

14. The method of claim 12, wherein the conductive pad comprises a power contact, wherein the step of providing the power to the IC card comprises:
providing the power to the IC card via the power contact.

15. The method of claim 14, wherein the conductive pad further comprises a signal contact, wherein the step of providing the commercial information or the personalized information to the IC card via the conductive pad comprises:
providing the commercial information or the personalized information to the IC card via the signal contact.

16. The method of claim 12 further comprising:
providing a card reader for updating the IC card, the card reader comprising a socket for placing the IC card, a plurality of pins, a power source, and a controller;
electrically connecting the power source to the pins and providing the power to the IC card via the pins; and
electrically connecting the controller to the pins and providing the commercial information or the personalized information to the IC card via the pins.

17. The method of claim 16 further comprising:
electrically connecting a host to the card reader for providing the commercial information or the personalized information to the card reader, and the card reader provides the commercial information or the personalized information to the IC card.

18. An IC card system comprising:
a card reader, comprising:
a socket;
a plurality of pins;
a power source, electrically connected to the pins, for providing a power; and
a controller, electrically connected to the pins, for receiving a commercial information or a personalized information from a host and providing the commercial information or the personalized information; and
an IC card, comprising:
a card body;
a conductive pad, electrically connected to the pins when the IC card is plugged in the socket, for receiving the power provided by the power source and the commercial information or the personalized information provided by the controller;
an electro-optic display located on the card body for displaying an information; and
a driving circuit, electrically coupled to the conductive pad and the electro-optic display, for receiving the power from the conductive pad and driving the electro-optic display according to the commercial information or the personalized information.

19. The IC card system of claim 18, wherein the driving circuit comprises a memory, for receiving the commercial information or the personalized information from the conductive pad.

20. The IC card system of claim 18 further comprising:
a memory, electrically coupled to the conductive pad and the driving circuit, for receiving the commercial information or the personalized information from the conductive pad, and providing the commercial information or the personalized information to the driving circuit.

21. The IC card system of claim 18, wherein the conductive pad comprises:
a power contact for receiving the power; and
a signal contact for receiving the updating information.

22. The IC card system of claim 21, wherein the IC card provides a data stored in a memory to the card reader via the signal contact and receives the commercial information or the personalized information from the card reader via the signal contact with a time-division transmission.

23. An IC card comprising:
a card body;
a conductive pad, comprising a plurality of contacts, for receiving an updating information via a reserved contact of the plurality of contacts, wherein the conductive pad and the reserved contact comply with ISO/IEC 7810 or ISO/IEC 7816 standards;
an electro-optic display located on the card body for displaying an information; and
a driving circuit, electrically coupled to the conductive pad and the electro-optic display, for receiving the updating information from the reserved contact and driving the electro-optic display according to the updating information.

24. The IC card of claim 23, wherein the driving circuit comprises a memory, for receiving the updating information via the reserved contact.

25. The IC card of claim 23 further comprising:
a memory, electrically coupled to the conductive pad and the driving circuit, for receiving the updating information via the reserved contact, and providing the updating information to the driving circuit.

26. An IC card system comprising:
an IC card, comprising:
a card body;
a conductive pad, comprising a plurality of contacts, for receiving an updating information via a reserved contact of the plurality of contacts, wherein the conductive pad and the reserved contact comply with ISO/IEC 7810 or ISO/IEC 7816 standards;
an electro-optic display located on the card body for displaying an information; and
a driving circuit, electrically coupled to the conductive pad and the electro-optic display, for receiving the updating information from the reserved contact and driving the electro-optic display according to the updating information; and
a card reader, comprising:
a socket for allowing the IC card to plug in;
a plurality of pins, for electrically connecting to the conductive pad when the IC card is plugged in the socket; and
a controller, electrically connected to the pins, for providing the updating information to the IC card.

27. The IC card system of claim 26, wherein the driving circuit comprises a memory, for receiving the updating information via the reserved contact.

28. The IC card system of claim 26 further comprising:
a memory, electrically coupled to the conductive pad and the driving circuit, for receiving the updating information via the reserved contact, and providing the updating information to the driving circuit.

29. The IC card system of claim 28, wherein the IC card provides a data stored in a memory to the card reader via a contact and receives the updating information from the card reader via the reserved contact.

30. The IC card system of claim 28 further comprising a host electrically connecting to the card reader, wherein the host provides a commercial information or a personalized information to the card reader, and the card reader provides the updating information to the IC card according to the commercial information or the personalized information.

* * * * *